United States Patent [19]

Lewis et al.

[11] Patent Number: 4,464,768
[45] Date of Patent: Aug. 7, 1984

[54] ADAPTIVE PREPROCESSING SYSTEM

[75] Inventors: Bernard L. Lewis, Oxon Hill; Frank F. Kretschmer, Jr., Laurel, both of Md.

[73] Assignee: The United States of America as represented by the Secretary of the Navy, Washington, D.C.

[21] Appl. No.: 580,510

[22] Filed: May 28, 1975

[51] Int. Cl.³ .......................... H04B 1/12; G01S 13/52
[52] U.S. Cl. ...................................... 375/101; 328/165; 343/7.7; 375/102; 455/284; 455/296
[58] Field of Search ................. 343/7.7, 100 CL, 378; 325/474; 328/165; 455/284, 296; 375/96, 101, 102

[56] References Cited

U.S. PATENT DOCUMENTS

| | | | |
|---|---|---|---|
| 3,614,623 | 10/1971 | McAuliffe | 375/96 |
| 3,727,220 | 4/1973 | Brennan et al. | 343/7.7 |
| 3,775,768 | 11/1973 | Lisle et al. | 343/7.7 |
| 3,787,851 | 1/1974 | Hughes | 343/7.7 |
| 3,860,924 | 1/1975 | Evans | 343/7.7 |
| 3,876,947 | 4/1975 | Giraudon | 343/100 CL |
| 3,882,498 | 5/1975 | McGuffin | 343/7.7 |
| 3,932,818 | 1/1976 | Masak | 328/165 |

Primary Examiner—S. C. Buczinski
Attorney, Agent, or Firm—Robert F. Beers; William T. Ellis; Norman V. Brown

[57] ABSTRACT

The present invention preprocesses serial data sample sets so that truly independent samples are available for further processing. Samples to be analyzed are delayed and compared in order to isolate both components that are correlated between samples, and components that are uncorrelated between samples. These components provide independent information relating the samples which are used to modify or preprocess incoming data.

4 Claims, 2 Drawing Figures

4,464,768

ADAPTIVE PREPROCESSING SYSTEM

BACKGROUND OF THE INVENTION

The present invention relates to adaptive data processing systems, and more particularly to adaptive preprocessing systems which extract information relating samples in order to modify incoming data which is intended to be further processed in radar Moving Target Indicators and similar systems.

Signal processing equipment in general is designed to receive only particular desired information for evaluation. However, as is often the case, the desired information is not isolated by itself, but is found in the presence of unwanted signals. Depending on the purpose of the system these unwanted signals may take the form of information that is either correlated or uncorrelated with prior information-data samples. In other words, it is often desirable to remove either components of the signal that appear the same (i.e., correlated) in each information-data sample or signal components that appear to change from one sample to the next (i.e., information uncorrelated between samples).

The importance of extracting information of this nature is clear and well-known in diverse applications of data processing. For example, a pattern recognition system is concerned primarily with information that is correlated from sample to sample. Similarly, in a Moving Target Indication radar system, "sea clutter" or "chaff" are represented by data which is relatively slowly changing (with respect to a moving target); thus the correlated information between successive radar samples is comprised predominately of interference or otherwise non-relevant information that should be eliminated.

Prior data processing systems of various types, as well as the present invention, have attempted to utilize either the correlated or uncorrelated components between successive data samples in modifying incoming data for further processing. But prior techniques generally employ either parallel canceller loops or series iterative loops which function in an equivalent manner. Parallel loop or equivalent techniques are unsatisfactory basically because they are interactive in nature, that is, the action of one loop depends upon the effects the actions of other loops. These interactive loops are unsatisfactory because they have longer setting times than independent canceller loops and must employ reduced loop gain to prevent loop-to-loop oscillation. In the series-iterative technique, undesirable aspects include the requirement for a large or excessive number of stages, thus increasing system size and cost, while at the same time reducing system reliability.

Copending Pat. Application Ser. No. 580,395 entitled "Adaptive MTI" by Frank F. Kretschmer, Jr., Bernard L. Lewis and James P. Hansen, filed in the United States on an even data herewith and assigned to the same assignee of the present invention discloses a system somewhat similar to the present invention, although it is of different type (in that it is of limited iterative nature) and is configured in a different manner.

Accordingly, the present invention has been developed to overcome specific shortcomings of the above know, and similar techniques, and to provide a data processing technique for minimizing or enhancing particular aspects of an incoming data sample through resort to extraction of independent information between successive samples.

SUMMARY OF THE INVENTION

The present invention examines successive data samples in order to extract both correlated and uncorrelated components of the data between successive data samples. The components thus extracted are used to modify incoming data which is to be further processed. This modification caauses undesired aspects of immediately prior data samples to be removed from the incoming data, or causes the incoming data to enhance desired aspects.

The embodiment of the present invention compares successive data samples (delayed in time so that the comparison may readily be made), extracts from the compared samples information related to correlated and uncorrelated components. These components are subtracted from incoming data so as to reduce or enhance components of the incoming signal corresponding to the extracted correlated or uncorrelated components.

In accordance with the principles of the present invention, a number, n, of data samples will yield at most n+1 independent pieces of information. The n+1 pieces of independent information are comprised of either components common to all samples being examined or components in any sample not common to any of the other samples being examined.

It is therefore an object of the present invention to extract independent pieces of information relating successive data samples through independent and non-interactive and non iterative means in order to modify an incoming data sample;

Another object of the present invention is to extract a number of at most n+1 pieces of independent information from a group of n data samples in order to modify an incoming data sample;

It is a still further object of the present invention to modify an incoming data sample of radar information in order to minimize "clutter" or "chaff" interference, while at the same time to enhance target information to a Moving Target Indication radar system;

Other objects, advantages and novel features of the invention will become apparent from the following detailed description of the invention when considered in conjunction with the accompanying drawings wherein:

DETAILED DESCRIPTION OF THE INVENTION

Figure 1:
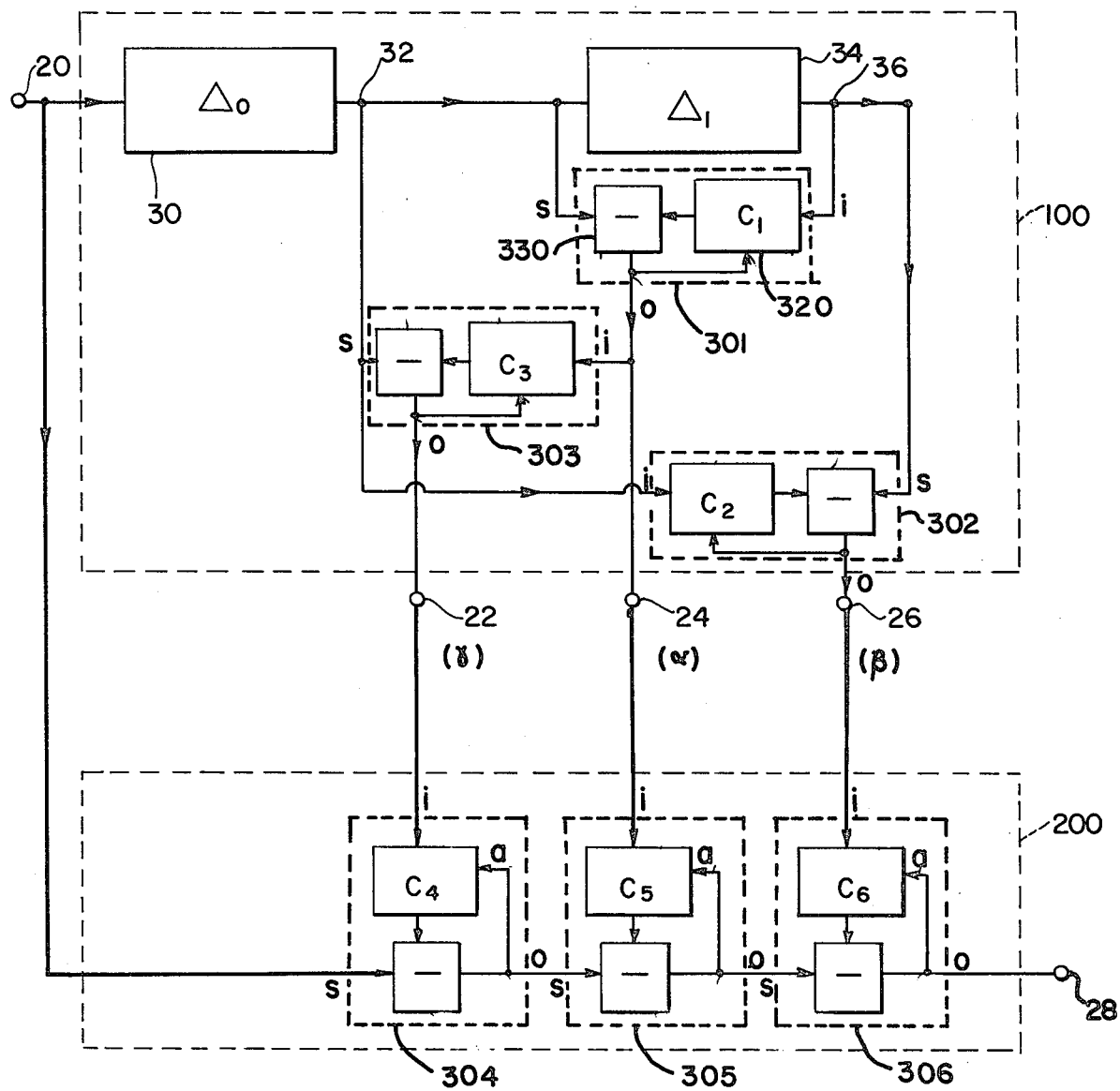
FIG. 1 depicts in block diagram schematic form the described embodiment of the present invention.

Referring to FIG. 1, the schematic diagram shows an embodiment of a preprocessing and canceller system according to the present invention. In the described embodiment, the invention will be described with reference to a Moving Target Indication radar system providing return radar signals to a preprocessor input terminal 20. For simplicity, the radar receiver portion has been omitted in the drawing since it contributes nothing to the inventive principle, it being obvious that such receivers are incorporated to receive the antenna signals in a manner well-known in the art. Further, it is to be understood that other types of data gathering systems which provide and utilize serial data samples may be benefited by utilization in combination with the present invention. Optical pattern recognition systems, signal integration systems, and learning machines, as well as many other types of systems, for example, are of this type.

FIG. 1 shows a delay and independent component extracting means depicted in phantom at 100, and a signal modifying means, depicted in phantom at 200, connected thereto. Independent component extracting means 100 has an input-terminal 20 and first, second, and third output-terminals 22, 24, 26. A first delay-device 30 has its input-terminal connected to input-terminal 20. Delay-device 30 has an output-terminal 32 connected to the input-terminal of a second delay-device 34. Second delay-device 34 has an output-terminal 36.

Figure 2:
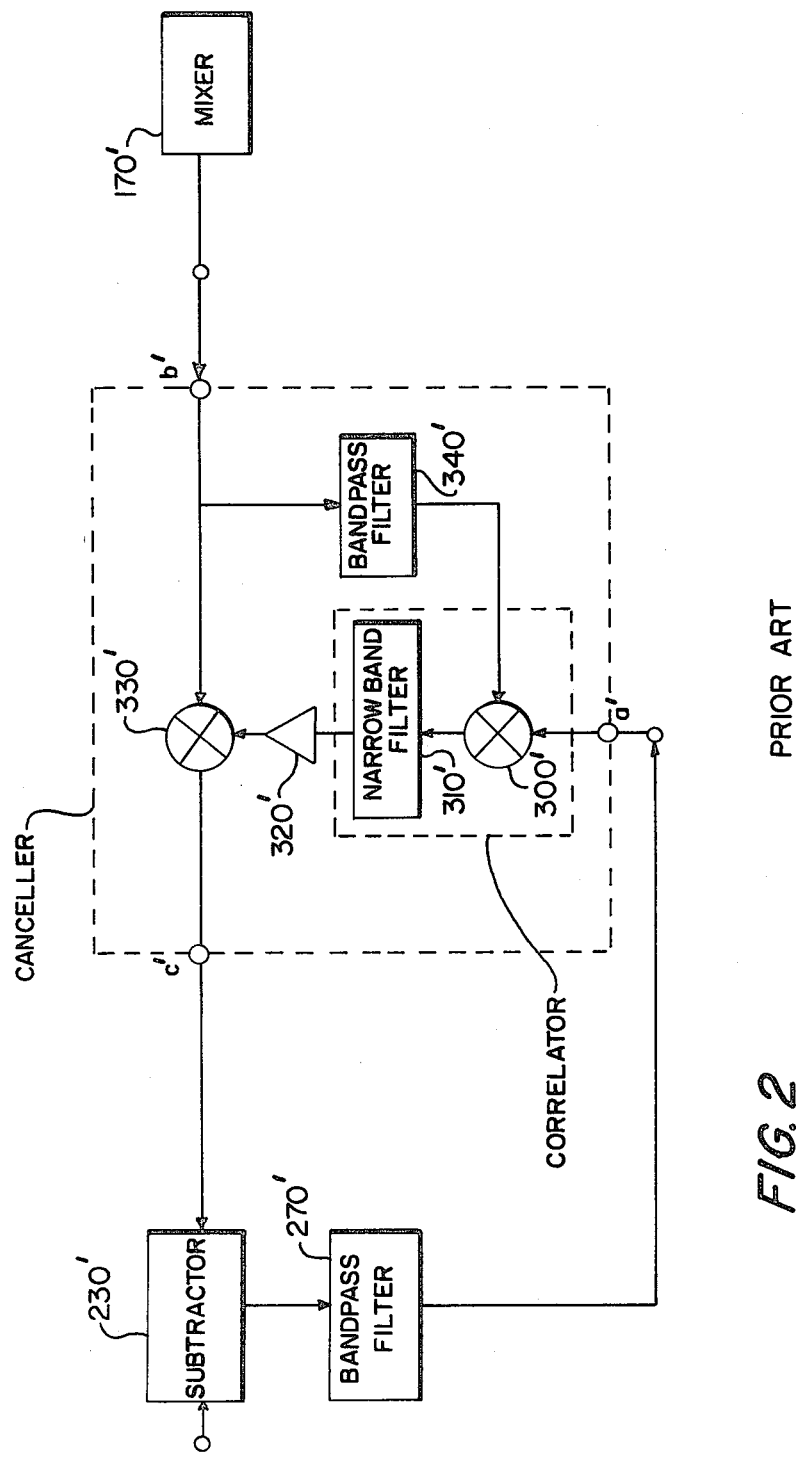
FIG. 2 is a schematic diagram of one form of canceller known to the prior art.

Independent component extracting means 100 and signal modifying means 200 utilize a number of devices 301–306 herein termed "signal-canceller" devices. Each signal-canceller device has an auxiliary input-terminal i, a main input-terminal s, and an output-terminal "o". Each of these signal-canceller devices 301–306 is comprised of a canceller device 320 and a subtractor device 330. The auxiliary input-terminal i is connected to the input to the canceller device 320, and the main input-terminal s is connected to a first input of the subtractor device 330. The output-terminal o is connected to the subtractor 330 output-terminal. The output of the canceller 320 is connected to the second input terminal of subtractor 330, while the output of subtractor 330 is fed back to a feedback input-terminal "a" of canceller 320. It should be understood that the canceller devices utilized in the described embodiment form no part of the present invention. These devices are conventional in the art, and a functional schematic of a typical prior art canceller is shown in FIG. 2. The theory behind the operation of this prior art system is generally taught by the patent to Howells, 3,202,990, reference to which is hereby made, and will not be discussed in great detail. Generally, however, the canceller is formed from a conventional mixer or multiplier circuit 300' receiving the output from a bandpass filter 270' through input a'. The signal at input b' (from a mixer 170) is applied through bandpass filter 340' (having the same time-delay as bandpass filter 270') to a second input mixer 300'. The signal at input b' is also applied to the input of mixer 330'. The output of mixer 300' is passed through a narrow-band filter 310' and an amplifier 320' to a second input to the mixer 330'. The output signals at terminal c' are then applied to the input to a subtractor 230'. While the narrow-band filter 310' and amplifier 320' have been shown as separate elements, the same could just as well be replaced by a narrow-band amplifier.

In general, the signal applied at auxiliary input-terminal i is termed g(t), the signal applied at the canceller feedback input-terminal "a" is termed f(t) (which signal is also present at output-terminal "o"), and the signal at the main input terminal "s" is termed h(t). The canceller 320 multiplies its signal g(t) by its signal f(t) and integrates the product to arrive at a correlation coefficient $\sigma$ (i.e., $\sigma = (1/T) \int_0^T f(t)g(t)dt$, where $T = (1/B)$, and where B is the open loop bandwidth). Then canceller 320 employs $\sigma$ to phase shift and attenuate g(t) so that it will subtract from h(t) to minimize the correlation between f(t) and g(t), where $f(t) = h(t) - \sigma g\ (t \pm \Delta t)$. Thus the canceller attempts to decorrelate its output f(t) at output-terminal "o" from its auxiliary input signal g(t) at terminal i.

The first three signal cancellers are utilized in the independent component extracting means 100 as follows:

The first signal-canceller device 301 is connected with its main input-terminal s connected to the output-terminal 32, and its auxiliary input-terminal i connected to output-terminal 36. Its output-terminal o then provides a signal $\alpha$ proportional to the signal at output-terminal 32 which is uncorrelated with the signal at output-terminal 36. Its output terminal o is connected to independent component extracting means output-terminal 24.

The second signal canceller means 302 is connected with its main input-terminal s connected to output-terminal 36, and its auxiliary input-terminal i connected to output-terminal 32. Its output-terminal o then provides a signal $\beta$ proportional to the signal at output-terminal 36 which is uncorrelated with the signal at output-terminal 32. Its output-terminal o is connected to delay-correlator output-terminal 26.

The third signal canceller 303 is connected with its main input-terminal s connected to output-terminal 32, and its auxiliary input-terminal i connected to the output-terminal o of first signal canceller 301 (i.e., to signal $\alpha$). Its output-terminal o then provides a signal $\gamma$ proportional to the signal at output-terminal 32 which is correlated with the signal at output-terminal 36. Its output-terminal o is connected to delay-correlator output-terminal 22.

The second three signal cancellers form the signal modifier 200 as follows: The auxiliary input-terminal i of the third, fourth, and fifth signal cancellers 304, 305, and 306 is respectively connected to independent component extracting means output-terminals 22, 24, 26.

The main input-terminal s of fourth canceller device 304 is connected to the device signal input-terminal 20. The output-terminal o of fourth canceller 304 is connected to the main input-terminal s of fifth canceller 305, which in turn has its output-terminal o connected to the main input-terminal s of sixth signal canceller 306. The output-terminal o of sixth signal canceller 306 is connected to a device output terminal 28.

The signal at output-terminal "o" from canceller 304 is the same as the input signal applied at device input-terminal 20, but as reduced by the signal $\gamma$. Similarly, the output from canceller 305 is the same as the signal from the output o of canceller 304 but as reduced by the cancellation signal $\alpha$; while the signal at the output terminal o of signal canceller 306 is the same as that of the output o from canceller 305, but as reduced by the signal $\beta$.

In operation, delay devices 30, 34 form a cascaded set of delays, each delay being equal to the radar's interpulse period (or, in other systems, the time between incoming data samples). These delays thus enable obtaining of simultaneous data samples (i.e., echoes from several successive radar transmissions). The number n of delay devices used is equal to the number of prior data samples which it is desired examine. Thus, the two delays utilized in the described embodiment of the invention provide two prior data samples. From these two samples, it is possible to derive three and only three independent pieces of information, namely: (1) the information at the output of the first delay that is correlated with that out of the second delay, (2) the information out of the first delay that is uncorrelated with that out of the second delay, and (3) the information out of the second delay that is uncorrelated with that out of the first delay. As previously described, these three pieces of information correspond to the signals α, β, γ from signal cancellers 301, 302, 303.

In general, the maximum number of independent pieces of data that may be derived from n data samples is n+1. This maximum number n+1 may include redundant or ambiguous data, thereby causing the number of independent pieces of information to be less than n+1.

The signal modifier 200, as described above causes the signals α, β, γ to be subtracted from the input signal applied at device input-terminal 20, thereby eliminating the correlated components (i.e., clutter) derived from examination of the prior n samples.

Thus it may be seen that the cancellers use the n+1 pieces of information to place n "zeroes" in the frequency domain to optimally reduce the "clutter" power.

It should be noted that the response time of the series of cancellers comprising signal modifier 200 can be readily made long enough to prevent cancellation of desired targets which have low duty cycles. Alternatively, "fast loops" can be employed to reduce both clutter and targets to thermal noise level and a fast Fourier transform device (filter) can be used to pull targets out of the noise.

Many advantages accrue by use of the present invention. For example, in a M.T.I. type system, higher clutter cancellation ratios can be obtained for a given number of pulses processed, and the system is inherently stable because no feedback paths exist between adaptive loops (signal cancellers). In addition, "pulse stagger" losses normally associated with attempts to eliminate "blind speeds" will be eliminated.

Obviously, the independence of each signal canceller results in shorter settling time than where interactive loops are utilized.

As can be seen from the above description, the present invention provides an improved technique for increasing the ability of a data preprocessing system to eliminate undesired signal components from an incoming data sample, based on extraction of these components from examination of prior samples.

While the invention has been described with particular reference to a Moving Target Indicator radar system, the teachings are equally applicable to many other signal processing systems such as sonar, learning machines, pattern recognition systems, and similar such systems having serial data of a nature compatible with preprocessing in accordance with the principles of the present invention as herein described.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A device for preprocessing incoming serial data samples comprising:
   means for receiving sequential incoming data samples;
   a plurality of serially connected delay means coupled to said receiving means, each said delay means providing an output signal and being arranged to delay each said incoming sample such that the delayed and undelayed samples are simultaneously available;
   a plurality of first means, at least one being coupled to the output and input of the last of said delay means for extracting non-correlative components of each said data sample simultaneously available and at least one being coupled to the outputs of a delay means and one of said first means to extract the correlative components of said outputs; and
   a plurality of serially connected second means, the first being coupled to said incoming data sample receiving means to receive said data samples and each being coupled to a different one of said first means to receive said extracted components, said second means modifying said incoming data samples to reduce undesired signal components in said incoming data samples at the output of said second means,
   each said first and second means having a feedback path which is independent of the feedback path of any of the other of said first and second means.

2. The data preprocessing system of claim 1 wherein said first means comprises a plurality of signal cancellers, with a first group of selected ones of said plurality of signal cancellers being coupled to receive a first input signal from the output of the second of said delay means and a second input signal from the output of the first of said delay means, and with a second group of selected ones of said plurality of signal cancellers being coupled to receive a first input signal from the input to the second of said delay means and a second input signal from the output of a selected one of said first group of selected signal cancellers, the output of each canceller of said first and second groups providing a component intermediary signal proportional to either the correlation or uncorrelation of data at the outputs of said delay means, whereby a number of n simultaneous output data samples at the output of said delay means will result in not more than n+1 independent pieces of information.

3. The data preprocessing system of claim 1 wherein each of said first and second means comprises a signal canceller and each of said signal cancellers comprises:
   canceller means coupled to receive first and second input signals for producing an output signal proportional to the correlation of said first input signal with said second input signal; and
   means, coupled to said canceller means for subtracting said output signal of said canceller means from said first input signal, to provide a cancellation signal proportional to an input signal of said first or second means, the output of said subtractor means connected to an input feedback terminal on said canceller means.

4. The data preprocessing system of claim 1 wherein said second means comprises a serially connected plurality of said signal cancellers coupled in such a manner that the first of said serially connected signal cancellers receives an input signal from said data sample receiving means, and receives a component intermediary input signal from one of said signal cancellers of said first means, each said serially connected signal-canceller providing an output signal reduced in undesired signal by its component intermediary signal, and wherein each subsequent one of said series-connected signal-cancellers has one input coupled to the output of the preceeding serially connected signal canceller, and another input coupled to a component intermediary input signal from one of said signal cancellers of said first means, whereby each signal canceller of said second means produces an output signal reduced in undesired signal by its component intermediary signal.

* * * * *